United States Patent [19]

Yamamoto

[11] 4,406,533

[45] Sep. 27, 1983

[54] FLASH PHOTOGRAPH SYSTEM

[75] Inventor: Hiroshi Yamamoto, Yokohama, Japan

[73] Assignee: Canon Kabushiki Kaisha, Tokyo, Japan

[21] Appl. No.: 310,872

[22] Filed: Oct. 13, 1981

[30] Foreign Application Priority Data

Oct. 14, 1980 [JP] Japan .............................. 55-143454

[51] Int. Cl.³ ...................... G03B 15/05; G03B 17/02
[52] U.S. Cl. .................................... 354/145; 354/288
[58] Field of Search .......................... 354/27, 32–35, 354/60 F, 126, 129, 139, 145, 149, 288

[56] References Cited

U.S. PATENT DOCUMENTS

| | | | |
|---|---|---|---|
| 3,286,612 | 11/1966 | Lieser | 354/129 |
| 3,358,573 | 12/1967 | Bihlmaier | 354/126 |
| 3,712,197 | 1/1973 | Wagner | 354/145 X |
| 4,096,492 | 6/1978 | Land et al. | 354/60 F |
| 4,204,140 | 5/1980 | Willis | 354/145 X |

FOREIGN PATENT DOCUMENTS 55-124128 9/1980 Japan .................................. 354/145

Primary Examiner—William B. Perkey
Attorney, Agent, or Firm—Toren, McGeady and Stanger

[57] ABSTRACT

A flash-light photographic system consisting of a camera and a flash device which are arranged independently of each other. The camera is provided with a holding part which is disposed close to a grip part of the camera body and is arranged to be capable of engaging a shoe part of a flash device arranged separately from the camera. When flash photography is not required, the flash device is attached to a part of the camera body close to the grip part thereof, so that the flash device can be utilized for gripping the camera thereby improving portability.

7 Claims, 12 Drawing Figures

FLASH PHOTOGRAPH SYSTEM

BACKGROUND OF THE INVENTION

1. Field of the Invention

This invention relates to a camera with a flash device and more particularly to a camera arranged to have an attachable and detachable flash device stowed at a camera gripping part when the flash device is not in use.

2. Description of the Prior Art

Cameras of varied kinds incorporating a small flash device, an automatic film winding device, etc. have recently been put to practical use. A compact camera using a non-interchangeable lens can be arranged into this type without significantly increasing the size and the weight thereof. However, in the case of a camera such as a single-lens reflex camera that has a complex mechanism, such an arrangement intended to incorporate a flash device therein is difficult because a larger power source must be used for emission of a sufficiently large quantity of light from the flash device. Further arrangement to include an automatic film winding mechanism makes the camera too large for convenient use of the camera. It is therefore difficult to have a flash device incorporated in a single-lens reflex camera. Accordingly, the flash device and a camera are arranged separately from each other. However, such a separate arrangement impairs portability.

SUMMARY OF THE INVENTION

It is an object of this invention to provide a camera system of the type having a camera and a flash device arranged into separate bodies wherein the above-stated problem is solved by the provision of a holding part arranged on the front of the camera body to have the shoe part of the flash device attached thereto so that the flash device can be attached to the front of the camera body to be utilized at least as a part of the grip of the camera when the flash device is not in use.

It is another object of the invention to provide a camera system wherein a flash control circuit such as a trigger circuit or the like is incorporated in the camera body to lessen the number of components constituting the flash device, so that the flash device can be made smaller and lighter for improved portability.

It is a further object of the invention to provide a camera system which is arranged to have a flash device automatically rendered operative by mounting the flash device on the camera for improved operability of the camera system.

These and further objects, features and advantages of the present invention will become apparent from the following detailed description of preferred embodiments thereof taken in connection with the accompanying drawings.

DETAILED DESCRIPTION OF PREFERRED EMBODIMENTS

Figure 1:
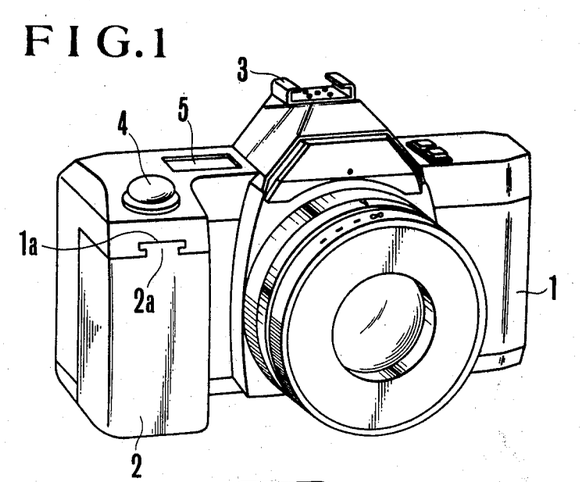
FIG. 1 is an oblique view showing the appearance of a camera having a flash device constituting an embodiment of the present invention.
Figure 2:
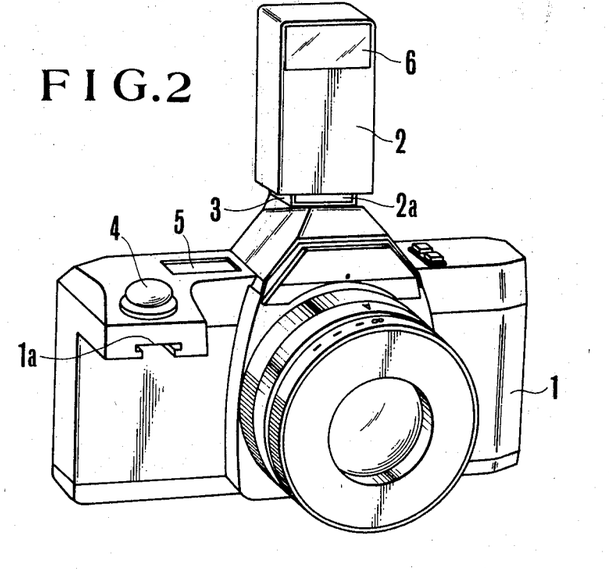
FIG. 2 is an oblique view showing the appearance of the camera shown in FIG. 1 in a state wherein the flash device is in use.

FIG. 1 is an oblique view showing a camera having a flash device which is stowed at a grip part of the camera. FIG. 2 shows the camera with the flash device mounted on an accessory shoe of the camera. The system comprises a camera body and a flash device housing 2 arranged to form a camera grip part as shown in FIG. 1 by inserting a leg part 2a of the flash device into a coupling part 1a arranged on the camera body. An accessory shoe 3 of the camera has the contact thereof arranged as will be hereinafter described. The camera includes a shutter release button 4, an indication window 5 arranged to show a counted number of frames and photographic information and a light emission window 6 of the flash device. This light emission window is protected and not seen from the outside when the flash device is stowed in the grip part as shown in FIG. 1 with the window directed toward the camera body. Referring to FIG. 2, the light emission window 6 and the optical axis of a photo taking lens are spaced at a suitable distance from each other. This not only prevents the phenomenon called "red eye phenomenon" but also prevents the flash light from being blocked by a lens barrel in cases where an object located at a short distance is photographed with a lens of long focal length mounted on a single-lens reflex camera.

Figure 3:
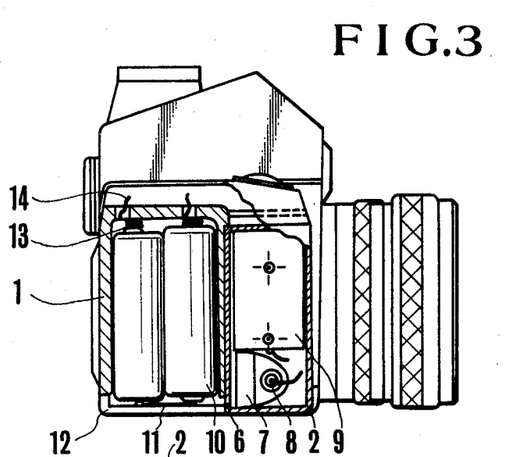
FIG. 3 is a sectional view showing the arrangement of the area around the grip part of the camera of the invention.
Figure 4:
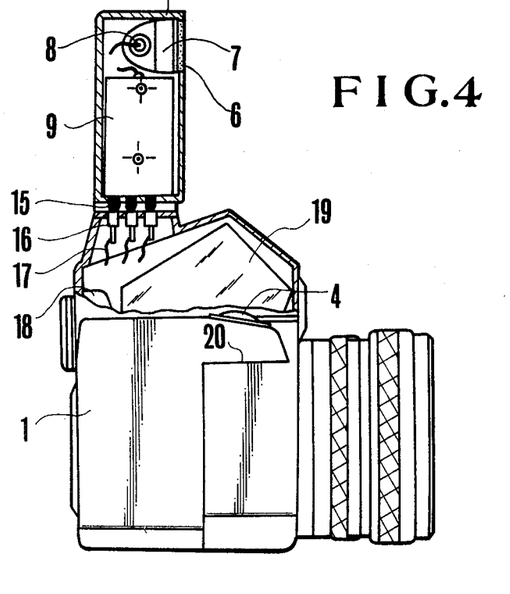
FIG. 4 is a sectional view showing a flash device mounting part of the embodiment shown in FIG. 2.

FIG. 3 is a sectional view showing an area around the grip part of the camera having a flash device in accordance with the invention. The illustration includes a flash light reflection shade 7 a light emitting tube 8 and a main capacitor 9 of the flash device. These parts are arranged within the housing 2 of the flash device which forms an attachable and detachable grip part. The constituent elements of a flash circuit other than these parts are disposed within the camera body, so that the flash device 2 which forms the grip part can be arranged to be of a size as small as possible. Power source batteries 10 are disposed close to the grip part within the camera body. A battery chamber is arranged to be opened and closed by a battery chamber lid 12, which is provided with a connection terminal 11. The batteries are connected in series. The output of the batteries 10 is supplied from a terminal 13 to an electrical circuit disposed within the camera body. Power supply is effected by this to a light measurement and exposure control system, a film feeding system, a driving part charging system and the flash device. FIG. 4 is a side view showing the camera with the flash device 2 shown in FIG. 3 removed from the grip part and mounted on a accessory shoe disposed on the upper surface of the camera. The illustration in FIG. 4 includes leg connecting pins 15 of the flash device 2 and connection terminals 16 on the side of the camera. The connection terminals 16 are connected to a flash circuit disposed within the camera body through conductors 17, an eyepiece 18, a pentagonal prism 19 and a flange portion 20 of the grip part on the side of the camera. The leg part of the flash device is inserted into this flange portion to form a grip part. This flange portion 20 contributes to improvement in the operability of the camera, because it enables the operator to keep a good hold of the camera while the flash device is in use. With the exception of the above-stated parts, all parts that are the same as those shown in FIGS. 1 through 3 are indicated by the same reference numerals as those used in FIGS. 1 through 3.

Figure 5:
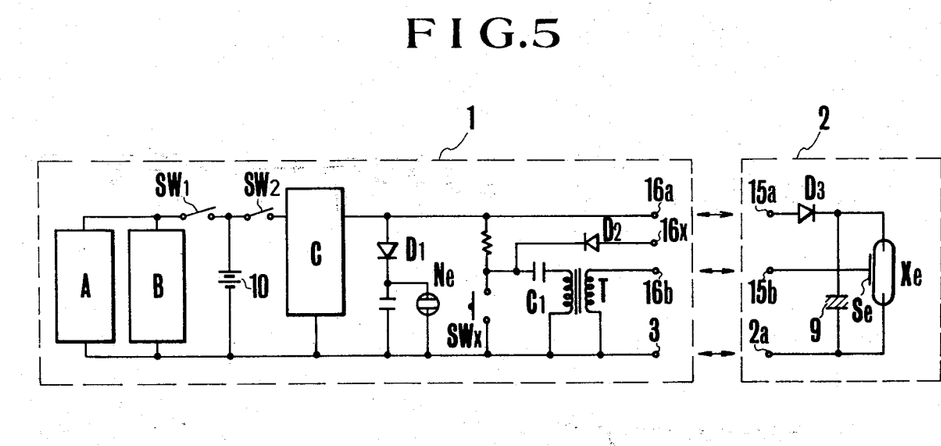
FIG. 5 is a circuit diagram showing a camera having a flash device in accordance with the invention.

Referring now to FIG. 5 which shows an electrical circuit of the camera of the invention, a block 1 represent the inside of the camera body and a block 2 represents a circuit within the attachable and detachable flash device. The camera is provided with an exposure control circuit A which is of a known type and a film feeding control circuit which is also of a known type. The circuits A and B are arranged to receive power supply from the power source battery 10 through a switch SW1. Power supply to the flash circuit is effected through a switch SW2. The switch SW2 is arranged to automatically turn on when the flash device 2 is mounted on the accessory shoe of the camera. Further, the switch SW2 remains off when any flash device other than the flash device 2 is mounted on the accessory shoe. There are further provided a DC booster circuit C, a charge completion display lamp Ne, an X contact SWx of the camera, a trigger capacitor C1 and a trigger transformer T. These elements constitute a known flash circuit. The flash device 2 includes a flash discharge tube Xe, a trigger electrode Se and a main capacitor 9. Further, there are provided diodes D1, D2 and D3 for the purpose of preventing an electric shock which might be induced when connection pins disposed at the leg parts of the accessory shoe and the flash device are touched by hand. Terminals 16a, 16b, 16x and 3 are connection pins disposed at the accessory shoe of the camera body while connection pins 15a, 15b and 2a are provided at the leg part of the flash device.

The circuit arranged as shown in FIG. 5 operates in the following manner: As mentioned in the foregoing, when the flash device 2 is removed from the grip part of the camera body and is mounted on the accessory shoe, the switch SW2 turns on. This causes a high voltage produced at the output terminal of the DC booster circuit C. Then, the main capacitor 9 is charged through the connection pins 16a and 15a and the diode D3. When the main capacitor 9 comes to have a sufficient voltage for flashing by the discharge tube Xe, the display lamp Ne is lit up to indicate this. When the X contact SWx is turned on by a shutter opening signal under this condition, the trigger circuit is actuated. Trigger pulses are impressed on the discharge tube Xe through the connection pins 16b and 15b to have a flash light emitted therefrom. Immediately after completion of photography with this flash light, the film feeding system B operates to wind the film. Further, among the connection pins arranged at the accessory shoe of the camera body, the connection pin 16x is an X contact terminal which is arranged to be used when a flash device (not shown) other than the flash device 2 of this invention is used. The provision of this connection pin 16x permits flash photography with some other flash device of larger light capacity.

Figure 6:
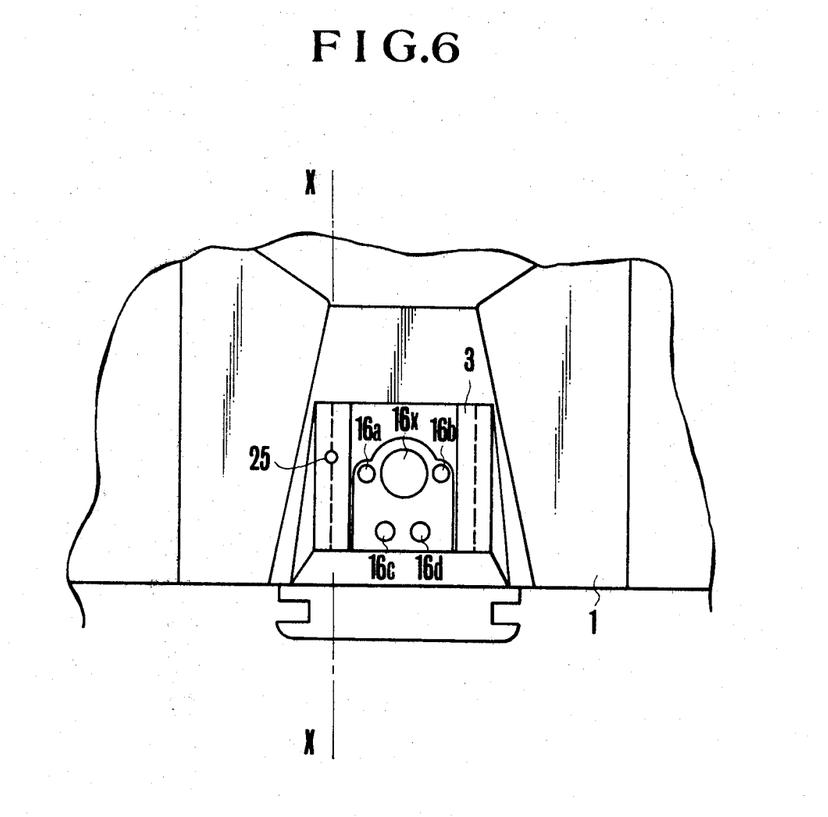
FIG. 6 is a plan view showing an example of an accessory shoe of a camera according to this invention.

FIG. 6 is a plan view showing an accessory shoe to be provided on the camera of the invention as an embodiment thereof. Referring to FIG. 6, connection pins 16a and 16b are the same as those shown by the same reference numerals in FIG. 5 and are arranged to have the flash device 2 according to the invention connected thereby. Meanwhile, for use of a different flash device as mentioned above, there is provided another X contact terminal 16x. Further, pins 16c and 16d are arranged to be used for transmission of information on the aperture setting, the shutter time, etc. designated by a known automatic flash device.

With the pins arranged as shown in FIG. 6, it is possible to use not only the flash device of the invention but also the conventionally known automatic flash devices. The arrangement also permits addition of an automatic light adjustment circuit to the flash device of the invention. Further, while the invention has been described as applied to a single-lens reflex camera in these specific embodiments, this invention is not limited to applications to such cameras but is applicable also to cameras of other kinds.

Figure 7A:
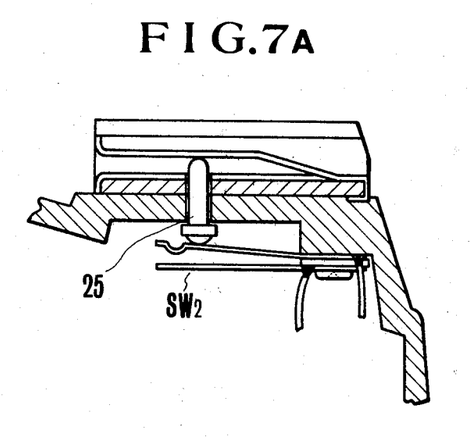
FIGS. 7(A) and (B) are sectional views showing the accessory shoe part taken on line X—X of FIG. 6.
Figure 7B:
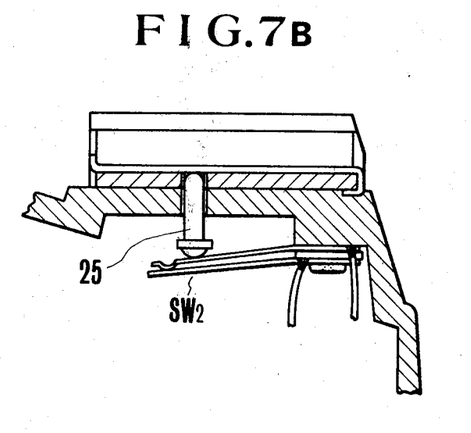

Referring further to FIG. 6, there is provided a signal lever 25 for turning the switch SW2 on when the flash device 2 is mounted. As shown in FIGS. 7(A) and (B) which are sectional views taken along line X—X of FIG. 6, this lever 25 is arranged at the accessory shoe 3 and is normally pushed up by a resilient force of the switch SW2 as shown in FIG. 7(A). When the flash device 2 is mounted on the accessory shoe by sliding the hot shoe of the flash device, this causes the lever 25 to move downwards as shown in FIG. 7(B) and the switch SW2 is turned on thereby.

Figure 8:
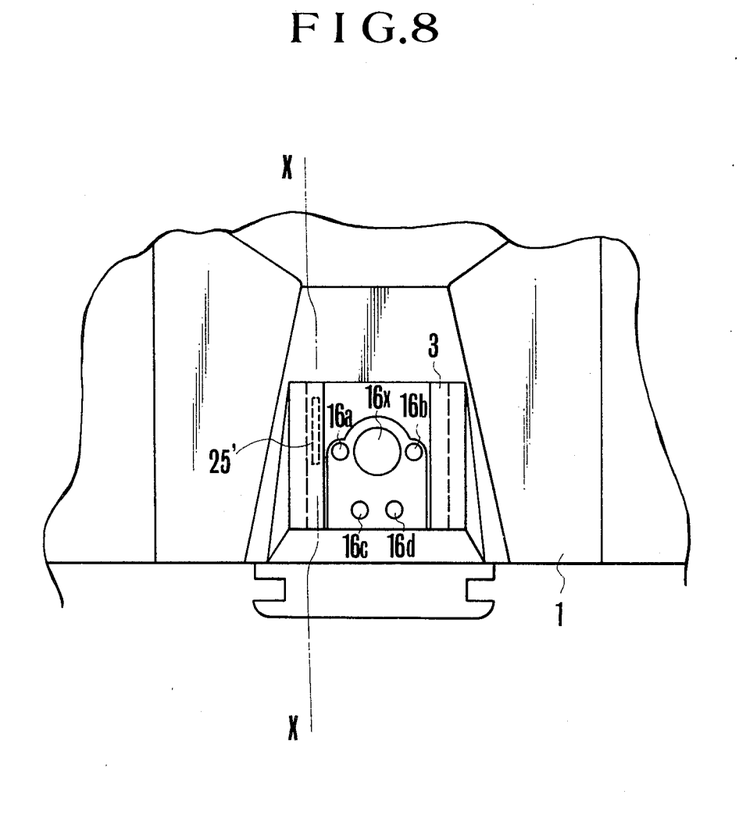
FIG. 8 is a plan view showing an accessory shoe of a camera constituting another embodiment of the invention.
Figure 9A:
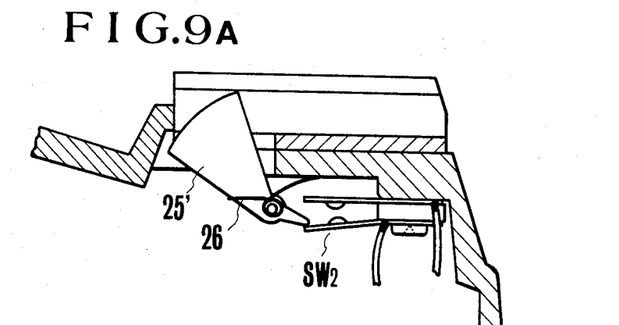
FIGS. 9(A), (B) and (C) are sectional views of the accessory shoe part taken on line X—X of FIG. 8.
Figure 9B:
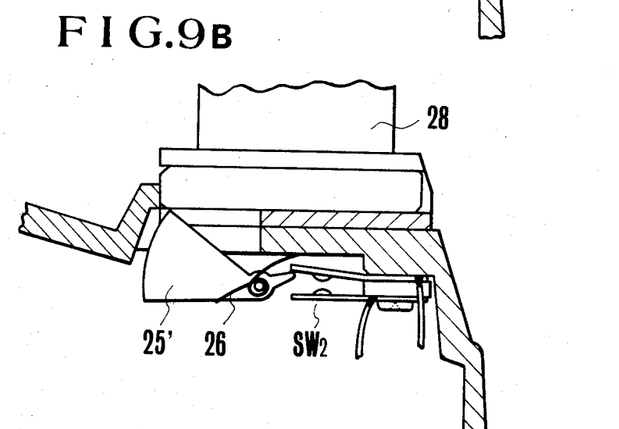
Figure 9C:
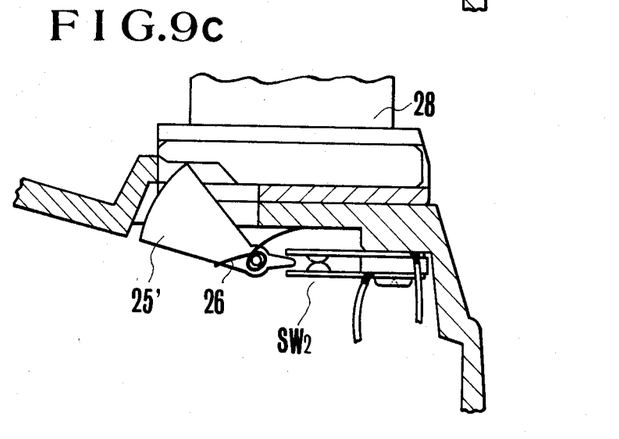

Another example of the accessory shoe part of the camera shown in FIGS. 1 through 5 is as shown in FIGS. 8 and 9A-C, which are a plan view and sectional views taken on line X—X of FIG. 8 respectively. The example shown in FIGS. 8 and 9A-C differs from the preceding example of the accessory shoe shown in FIGS. 6 and 7. In this case, a switch SW2 is arranged to turn on only when the flash device according to the present invention is mounted and to remain off when other flash devices are mounted. In this example, there is provided a rotating lever member 25, which is urged by a spring 26 to rotate clockwise and is pressed into contact with a shoe guide face 27 as shown in FIG. 9(A) when the flash device is not mounted on the accessory shoe part. The switch SW2 is kept off under this condition. In cases where a conventional flash device is mounted, the shoe part 28 of the flash device as shown in FIG. 9(B) causes the lever 25' to rotate counterclockwise from the state shown in FIG. 9(A) to keep the switch SW2 off. When the flash device according to the invention is mounted, the lever 25' moves as shown in FIG. 9(C) to an intermediate position between the positions shown in FIGS. 9(A) and (B) to turn on the switch SW2 because of a notch provided at one end of the bottom of the shoe part 28 of the flash device. With the notch arranged in this manner, the switch SW2 is automatically turned on only when the invented flash device is mounted on the accessory shoe.

As described in the foregoing, in the camera having the flash device according to the invention, the light emitting part of the flash device is formed to serve as a camera gripping part for improvement in the hold of the camera during an ordinary photographing operation. Then, for flash photography, the flash light emitting part of the flash device is mounted on the accessory shoe of the camera. This arrangement according to the invention not only contributes to reduction in size and weight of the camera but also gives many advantageous features to the camera as described in the embodiment examples given in the foregoing.

What is claimed is:

1. A camera usable with a flash device, comprising:
   (a) an accessory shoe part for flash photography arranged to permit the shoe part of said flash device to be attached thereto and detached therefrom; and
   (b) a holding part for stowing said flash device, said holding part being arranged to have the shoe part of the flash device attachable thereto and detachable therefrom, said flash device being thus arranged to be stowable in one unified body with the camera when attached to said holding part.

2. A camera usable with a flash device, comprising:
   (a) a camera body;
   (b) an accessory shoe part for flash photography arranged to permit the shoe part of said flash device to be attached thereto and detached therefrom; and
   (c) a holding part for stowing said flash device, said holding part being arranged in a part by which a photographer grips said camera body while photographing an object with said camera and being arranged to have the shoe part of said flash device attachable thereto and detachable therefrom, said flash device being thus arranged to serve at least as a portion of the grip part of said camera when the flash device is attached to said holding part.

3. A camera usable with a flash device, comprising:
   (a) a camera body;
   (b) an accessory shoe part for flash photography arranged to permit the shoe part of said flash device to be attached thereto and detached therefrom; and
   (c) a stowing holding part arranged on the front of said camera body to have the shoe part of said flash device attachable thereto and detachable therefrom, said flash device being thus arranged to serve at least as a portion of the grip part of the camera when the flash device is attached to said holding part to be stowed there.

4. A camera usable with a flash device, comprising:
   (a) an accessory shoe part provided on a prismatically shaped part of the upper surface of a camera body for flash photography; and
   (b) a stowing holding part arranged on the front of the camera body to have the shoe part of said flash device attachable thereto and detachable therefrom, said flash device being thus arranged to serve at least as a portion of the grip part of the camera when the flash device is attached to said holding part to be stowed there.

5. A photographic system comprising:
   (A) a flash device including:
      (a) a shoe part arranged to be attachable to and detachable from an accessory shoe part of a camera;
   (B) a camera comprising:
      (a) an accessory shoe part for flash photography, said accessory shoe part being arranged to render the photographic system operative for flash photography when the shoe part of said flash device is mounted thereon; and
      (b) a stowing holding part arranged on the front of the camera body to have the shoe part of said flash device attachable thereto and detachable therefrom, said flash device being thus arranged to serve at least as a portion of the grip part of the camera when the flash device is attached to said holding part to be stowed there.

6. A camera adapted to be used with a flash device having a flash discharge tube and a shoe part with a trigger terminal connected to a trigger electrode of said flash discharge tube comprising:
   a trigger capacitor;
   a transformer connected to said trigger capacitor;
   a synchronous switch connected to said capacitor whereby a discharge path to said transformer for electric charge accumulated at said trigger capacitor is formed by the function of said switch;
   a first terminal connected to a secondary winding of said transformer;
   a second terminal connected to said synchronous switch through a unidirectional diode; and
   a mounting part having first and second terminals, said mounting part being so arranged that only when said shoe part of said flash device is mounted onto said mounting part, said first terminal and said trigger terminal are connected together and when a shoe part of other flash devices other than said flash device is mounted thereonto, said second terminal is connected to a trigger circuit of said flash device.

7. A photographic system comprising
   a flash device including:
      a flash discharge tube having first and second main electrodes and a trigger electrode;
      a main capacitor connected between said first and second main electrodes of said discharge tube; and
      a shoe part having a first terminal connected to said first main electrodes, a second terminal connected to said trigger electrode and a grounding contact piece connected to said second main electrode provided thereon;
      with a connecting point between said first main electrode and said main capacitor and said first main terminal being connected through a unidirectional conductor element; and
   a camera including:
      a power source battery;
      a booster circuit for boosting the voltage of said power source battery;
      a trigger circuit connected to said booster circuit, said trigger circuit having a trigger capacitor and a trigger transformer connected to said trigger capacitor;
      a synchronous switch connected to said trigger capacitor forming a discharge path to said transformer for electric charge accummulated at said trigger capacitor;
      a third terminal connected to a secondary winding of said transformer;
      a fourth terminal connected to said synchronous switch through a unidirectional diode;
      a fifth terminal connected to said output terminal of said booster circuit;
      a ground terminal; and
      a mounting part having said third, fourth, fifth, and ground terminals thereon, said mounting part being so arranged that said first and fifth terminals, said second and third terminals, and said grounding contact piece and said ground terminal are connected together only when said shoe part of said flash device is mounted onto said mounting part, with said fourth terminal being connected to a trigger circuit of another flash device when said another flash device is mounted on said mounting part.

* * * * *